United States Patent
Miao et al.

(10) Patent No.: US 6,892,010 B2
(45) Date of Patent: May 10, 2005

(54) PHOTODETECTOR/OPTICAL FIBER APPARATUS WITH ENHANCED OPTICAL COUPLING EFFICIENCY AND METHOD FOR FORMING THE SAME

(75) Inventors: Rongsheng Miao, Temple City, CA (US); Leo Kha, Diamond Bar, CA (US); Xin Simon Luo, Monterey Park, CA (US); Xiaoming Lou, Arcadia, CA (US)

(73) Assignee: Emcore Corporation, Somerset, NJ (US)

(*) Notice: Subject to any disclaimer, the term of this patent is extended or adjusted under 35 U.S.C. 154(b) by 94 days.

(21) Appl. No.: 10/657,836

(22) Filed: Sep. 9, 2003

(65) Prior Publication Data

US 2005/0053334 A1 Mar. 10, 2005

(51) Int. Cl.⁷ .............................. G02B 6/30
(52) U.S. Cl. ..................... 385/49; 385/39
(58) Field of Search ............................ 385/49

(56) References Cited

U.S. PATENT DOCUMENTS

| | | |
|---|---|---|
| 4,150,341 A | 4/1979 | Ferguson |
| 4,185,886 A | 1/1980 | Corrales |
| 4,534,616 A | 8/1985 | Bowen et al. |
| 4,732,450 A | 3/1988 | Lee |
| 5,265,177 A * | 11/1993 | Cho et al. ............... 385/14 |
| 5,581,649 A | 12/1996 | Paquette et al. |
| 5,774,613 A | 6/1998 | Tanabe et al. |
| 5,905,828 A | 5/1999 | Jungerman |
| 6,409,394 B1 | 6/2002 | Ueda et al. |
| 2002/0118917 A1 | 8/2002 | Kawai |

\* cited by examiner

Primary Examiner—Frank G. Font
Assistant Examiner—Eric Wong
(74) Attorney, Agent, or Firm—Christie, Parker & Hale, LLP

(57) ABSTRACT

An optical thick film formed on a photodetector improves the optical coupling efficiency between the optical fiber and photodetector which are optically coupled. The optical thick film has a refractive index that is between the refractive index of air and the refractive index of photodetector upon which the optical matching coating is disposed. Silicone may advantageously be formed as the optical thick film coating on the photodetector.

23 Claims, 3 Drawing Sheets

PHOTODETECTOR/OPTICAL FIBER APPARATUS WITH ENHANCED OPTICAL COUPLING EFFICIENCY AND METHOD FOR FORMING THE SAME

FIELD OF THE INVENTION

The present invention relates, most generally, to optoelectronic telecommunications systems. More particularly, the present invention relates to an assembly including an optical transmission medium optically coupled to a photodetector.

BACKGROUND OF THE INVENTION

Optoelectronic devices such as lasers, photodiodes and other photodetectors, have become widely used in the telecommunications and other industries. In optoelectronic devices, an electrical signal is converted to an optical signal that travels along an optical transmission medium such as an optical fiber, and is then converted back to an electrical signal. A high optical coupling efficiency is required to ensure good optoelectronic connections between the light source and the optical transmission medium, as well as between the optical transmission medium and the photodetector which detects the optical signal and converts the optical signal to an electrical signal.

In fiber-coupled packaging, laser light, which propagates through an optical fiber, is coupled into the active area of a photodetector either by a lens or by direct fiber coupling, depending on application. The optical coupling region typically includes an air gap between the optical fiber and photodetector and, when a lens is used, an air gap between the optical fiber and lens as well as between the lens and photodetector. The optical performance, or coupling efficiency, is limited by light loss due to reflection at the air/fiber, air/lens and air/photodetector interfaces. These effects are especially significant in 2.5–10 Gb/s (gigabits per second) applications because of the smaller active areas of photodetectors used in such applications. This makes it increasingly difficult to attain high optical performance or high optical coupling efficiencies in 2.5–10 Gb/s applications and, in turn, adversely affects the subsequent RF performance. It would therefore be desirable to provide an optical fiber coupled to a photodetector in which light loss due to reflection is eliminated or minimized. Previous attempts to address this issue include the use of various different lens types to improve focusing. This approach is limited by package size and the space available for positioning such a lens, especially in packages of reduced size such as used for high-speed applications. Furthermore, this approach does not address the loss in optical coupling efficiency due to light reflection at the air/photodetector interface.

In direct fiber coupling packaging, previous attempts to improve optical coupling efficiency include cleaving the optical fiber at an angle with respect to the photodetector, the angle selected to minimize back reflection. Another approach was tilting the photodetector at an angle with respect to the primary direction of the light beam being detected. Changing the cleave angle, however, only changes the direction of reflection to avoid laser light being directed back to the source. The loss of light still exists due to reflection at the interfaces between the angled end face of the optical fiber and air, as well as at the interface between the photodetector and air. Reflection also still exists when the photodetector is tilted and therefore the loss of light and reduced optical coupling efficiency still exists.

It would therefore be desirable to couple an optical transmission medium such as an optical fiber, to a photodetector, such that the amount of light lost between the optical fiber and photodetector is minimized or eliminated.

SUMMARY OF THE INVENTION

To address these and other needs, and in view of its purposes, the present invention provides an optical subassembly apparatus in which an optical transmission medium is optically coupled to a photodetector in an optical coupling region and an optical thick film is formed between the optical transmission medium and the photodetector in the optical coupling region.

One aspect of the invention is an apparatus comprising an optical transmission medium optically coupled to a photodetector in an optical coupling region and an optical thick film disposed on the photodetector in the optical coupling region. The optical thick film has a thick film refractive index that lies between the refractive index of air and the refractive index of the photodetector.

Another aspect of the invention is an apparatus comprising an optical transmission medium optically coupled to a photodetector in an optical coupling region and a discrete optical thick film formed on the photodetector. The discrete optical thick film increases the amount of light coupled from the optical transmission medium to the photodetector when light propagates in the optical transmission medium.

A further aspect of the invention is an apparatus comprising an optical transmission medium optically coupled to a photodetector in an optical coupling region that includes a smooth surface of the optical transmission medium, the optical thick film coating interposed between the smooth surface and the photodetector.

Another aspect of the present invention is a method for increasing optical coupling efficiency between an optical fiber and a photodetector. The method comprises providing an optical fiber and a photodetector, optically coupling the optical fiber to the photodetector in an optical coupling region and disposing a coating on the photodetector in the optical coupling region. The coating has a coating refractive index that lies between a first refractive index of air and a second refractive index of the photodetector surface upon which the coating is disposed.

BRIEF DESCRIPTION OF THE DRAWINGS

The present invention is best understood from the following detailed description, when read in conjunction with the accompanying drawings. It is emphasized that, according to common practice, the various features of the drawing are not necessarily to scale. On the contrary, the dimensions of the various features are arbitrarily expanded or reduced for clarity and to emphasize features of the present invention. Like numerals refer to like features throughout the specification and drawings. Included are the following figures:

FIG. 1A shows an exemplary front illumination photodetector and FIGS. 1B and 1C show exemplary back illumination photodetectors;

FIG. 3A is a direct coupled arrangement and FIG. 3B includes a lens;

DETAILED DESCRIPTION

An aspect of the invention provides an optical thick film that is introduced to the air/photodetector interface to improve optical coupling efficiency by reducing light loss due to reflection at the air/photodetector interface. The present invention finds application both in optical couplings that utilize a lens and in direct fiber coupled applications. The present invention finds application in high speed systems such as systems using frequencies of 2.5 Gb/s or greater.

Figure 1A:
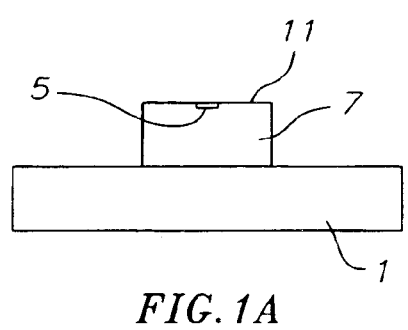
FIGS. 1A–1C are side views showing exemplary photodetectors.
Figure 1B:
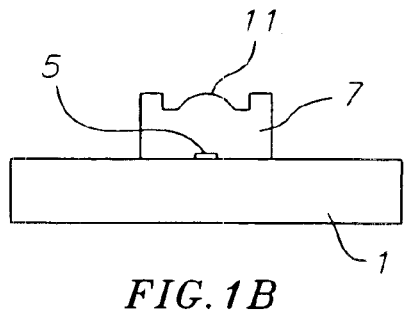
Figure 1C:
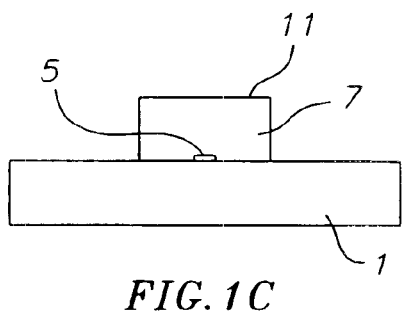

FIGS. 1A–1C shows photodetectors commonly used in the fiber optic telecommunication industry. FIG. 1A shows an exemplary front illumination photodetector and FIGS. 1B and 1C show back illumination photodetectors. In each embodiment, photodetector 7 is disposed on base substrate 1 and includes active area 5. Facing surface 11 is defined as the photodetector surface upon which the incoming light is impingent. AS such, in each of the embodiments of FIGS. 1A–1C, light will be directed to the photodetector from above photodetector 7. Photodetector 7 may be a semiconductor substrate with active area 5 being formed in or on the substrate. FIG. 1B shows a back illumination photodetector 7 with a facing surface 11 shaped into a microlens. Photodetector 7 may be formed of silicon or it may be formed of group III or IV semiconductor materials such as InP, GaAs or Ge, particularly for high speed applications. Silicon has a refractive index of about 3.3 and the materials used to form photodetector 7 in other embodiments, such as InP, GaAs and Ge, may include refractive indexes that range from 3.0 to 3.5. FIGS. 1A–1C are intended to be exemplary, and not restrictive, of commonly used photodetectors which may be used in the present invention. According to other embodiments, the photodetectors may be formed of different materials and include different configurations.

Figure 2:
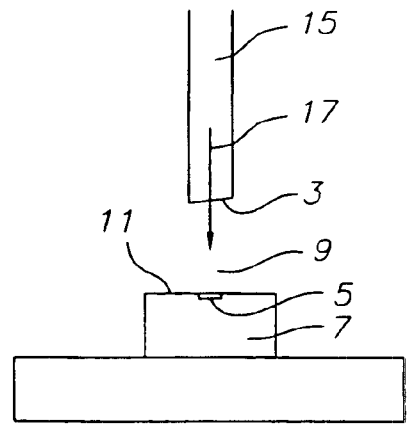
FIG. 2 is a side view showing an optical fiber coupled to a photodetector according to the PRIOR ART.

FIG. 2 shows an exemplary PRIOR ART arrangement of an optical transmission medium optically coupled to an exemplary front illumination photodetector in an optical coupling region. The optical transmission medium may be an optical fiber such as optical fiber 15 having end face 3. End face 3 is obliquely angled with respect to facing surface 11 of active area 5 of photodetector 7 in the illustrated embodiment. Between optical fiber 15 and photodetector 7 in the optical coupling region is a gap of air 9. As such, facing surface 11 of active area 5 of photodetector 7 forms an interface with air 9, i.e., the air/photodetector interface. In other exemplary embodiments in which a back illumination photodetector is used, facing surface 11 may be the surface of the photodetector that is opposite the surface including active area 5. Light propagation direction 17 is generally along the core of optical fiber 15.

Figure 3A:
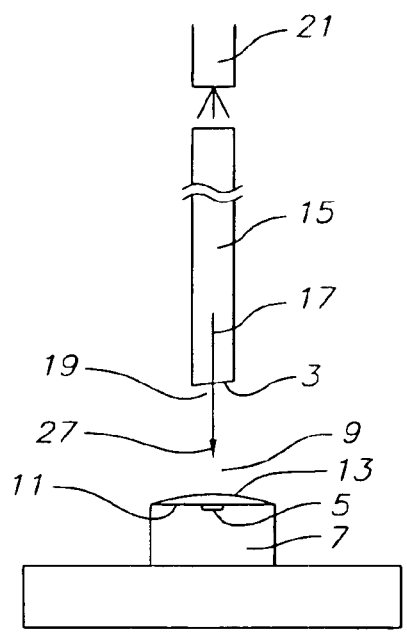
FIGS. 3A and 3B show exemplary embodiments of the optical thick film formed between an optical fiber and a photodetector according to the present invention.

FIG. 3A shows an exemplary embodiment of an optical subassembly of the present invention. The optical coupling apparatus of the optical subassembly includes an optical transmission medium, i.e., optical fiber 15 in the exemplary embodiment. Optical fiber 15 and photodetector 7 are optically coupled in an optical coupling region that includes facing surface 11. The optical coupling region refers to the region in which light from one component, such as optical fiber 15, is coupled to or travels to another component, such as photodetector 7 including active area 5. Optical fiber 15 may be coupled to photodetector 7 in a hermetic or non-hermetic package. Active area 5 is located within the optical coupling region, and along the optical path of light. Light propagation direction 17 is generally along the core of optical fiber 15. Various well known techniques and mechanical means may be used to secure optical fiber 15 in fixed position with respect to photodetector 7. Epoxy, solder and other materials may be used. In various exemplary embodiments, optical fiber 15 may be retained by an optical ferrule, not shown in FIG. 3A. In the exemplary embodiment shown in FIG. 3A, light propagates along light propagation direction 17 which is generally along the longitudinal direction of optical fiber 15 and a light beam exits optical fiber 15 at end face 3 and is delivered along light beam delivery direction 27 towards active area 5 of photodetector 7. End face 3 may be polished and smooth in an exemplary embodiment. For example, end face 3 may be polished to include a surface roughness $R_a$ no greater than 0.1 microns, but other surfaces may be used in other exemplary embodiments. Furthermore, the non-parallel relationship between end surface 3 and facing surface 11 is intended to be exemplary only. In other exemplary embodiments, end face 3 may be substantially parallel to facing surface 11 of active area 5 of photodetector 7, or the angles between end face 3 and facing surface 11 may vary from the illustrated relationship which may represent an angular variation of 7 to 9 degrees.

In the exemplary front illumination embodiment illustrated in FIG. 3A, facing surface 11 includes a surface of active area 5. In other exemplary embodiments such as back illumination embodiments, facing surface 11 may be the surface of photodetector 7 that is opposite active area 5. Facing surface 11 of photodetector 7 is coated with optical thick film 13 in the illustrated embodiment of FIG. 3A. The air/photodetector interface shown in FIG. 2 (the prior art) is now replaced by optical thick film 13 in the exemplary embodiment of FIG. 3A. A gap of air 9 exists between optical thick film 13 and end face 3 of optical fiber 15.

Figure 3B:
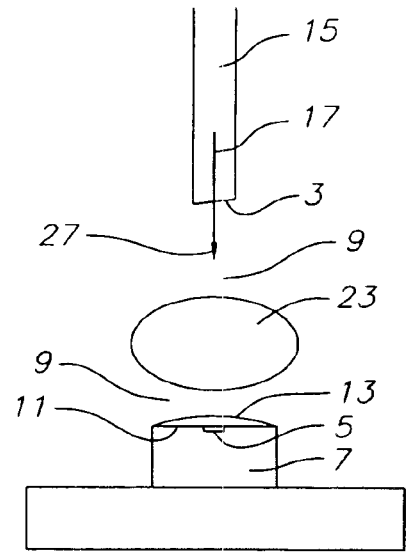

FIG. 3B shows another exemplary embodiment of optical thick film 13 formed in the optical coupling region on facing surface 11 of active area 5 of photodetector 7. Lens 23 is disposed within the gap of air 9 formed between optical fiber 15 and photodetector 7 in the optical coupling region and helps direct light from optical fiber to photodetector 7. Lens 23 may be formed of glass, quartz, sapphire or other suitable materials, and lens 23 may be securely positioned with respect to optical fiber 15 and photodetector 7 using various conventional means.

Optical fiber 15 may be any of various suitable optical fibers available in the art. Single mode or multimode optical fibers may be used. In other exemplary embodiments, optical fiber 15 may be replaced by other suitable optical transmission media. Photodetector 7 may be a PIN photodetector or various other suitable photodiodes or other photodetectors available in the art. The size of active area 5 and the materials used to form active area 5 will vary depending on application in various exemplary embodiments. The size of optical fiber 15 may also vary in the various exemplary embodiments. The relative position of optical fiber 15 and photodetector 7, as well as the spacing between these components, and the choice of a front or back illuminator photodetector will vary depending upon application. Various suitable arrangements of the components may be used.

The light propagating along primary propagation direction 17 of optical fiber 15 is provided by light source 21 shown in FIG. 3A. Light source 21 may be a laser, such as a VCSEL (vertical cavity surface emitting laser), but other lasers and other optical sources may be used in other exemplary embodiments. The light produced by such an optical source, propagating along optical fiber 15 and which exits optical fiber 15 at light delivery location 19 on end face 3 and along light beam delivery direction 27, is detected by photodetector 7 and converted to an electronic signal by photodetector 7 in conjunction with conventional electronic circuitry (not shown). Light of various wavelengths may be used. According to various exemplary embodiments, light having a wavelength of 1310 nanometers or 1550 nanometers may be used, but light having other wavelengths may be used in other exemplary embodiments. The present invention finds application in high-speed telecommunications systems such as telecommunications systems operating at frequencies of 2.5–10 Gb/s and higher.

Various conventional methods may be suitably used to form optical thick film 13 on photodetector 7 along the optical path, i.e., on facing surface 11 in the exemplary embodiments illustrated in FIGS. 3A and 3(B). For example, a syringe such as with micro-dispensing capabilities may be used to apply optical thick film 13.

Optical thick film 13 is placed between an incident medium, for example, air 9, and a transmitted medium, for example, photodetector 7 or, more particularly, any film or coating formed on facing surface 11 of photodetector 7. Optical thick film 13 is preferably chosen to be transparent with minimum absorption at the working wavelength. Optical thick film 13 includes a refractive index that is between the respective refractive indices of the incident medium and the transmitted medium that form the interface upon which the optical thick film is disposed. For example, optical thick film 13 formed on the air/photodetector interface between air 9 of photodetector 7, is chosen to have a refractive index that lies between the refractive index of air 9 and the refractive index of the material of which facing surface 11 of photodetector 7 is formed. If facing surface 11 includes the facing surface of active area 5 as in the illustrated front illumination embodiment, optical thick film 13 will have a refractive index that lies between the refractive index of air and the refractive index of the material of which the active area 5 surface is formed, more particularly, the refractive index of the upper layer of active area 5. In back illumination embodiments (see FIGS. 1B and 1C), optical thick film 13 will have a refractive index that lies between the refractive index of air and the refractive index of the material which forms facing surface 11 of photodetector 7, which is opposite the surface containing active area 5.

Without the optical thick film of the present invention, the reflectance of normal incidence for a single interface formed between an incident medium and a transmitted medium is determined according to Fresnel's Law and expressed as follows:

$$R = \left(\frac{n_i - n_t}{n_i + n_t}\right)^2 \qquad \text{(Equation \#1)}$$

where R=reflectance $n_i$=refractive index of incident medium $n_t$=refractive index of transmitted medium When an optical matching coating such as optical thick film 13 that includes a refractive index of $n_o$, is added to the incident/transmitted interface, the total reflectance for the first order of approximation can be expressed as follows:

$$R_T = \left(\frac{n_i - n_o}{n_i + n_o}\right)^2 + \left(\frac{n_o - n_t}{n_o + n_t}\right)^2 \qquad \text{(Equation \#2)}$$

where: $R_T$—total reflectance $n_o$—refractive index of the optical matching coating If the $n_i < n_o < n_t$, we have $R_T < R$ In an exemplary embodiment, optical fiber 15 may include a refractive index within the range of 1.4 to 1.5, or more particularly, within the range of 1.43 to 1.46, but optical fibers having other refractive indices may be used in other exemplary embodiments. Air 9 is typically assigned a refractive index of approximately 1.0. The relevant refractive index of photodetector 7 is determined by the material of which the upper facing surface 11 of photodetector 7 is formed. As such, in the front illumination embodiments such as illustrated, the relevant refractive index is the refractive index of the material that forms the upper surface of active area 5 that forms part of facing surface 11. In one exemplary embodiment, the relevant refractive index may be about 2.2. In an exemplary embodiment, the upper facing surface of active area 5, i.e., of facing surface 11, may be formed of silicon nitride, but other materials may be used in other exemplary embodiments. For example, materials having refractive indexes ranging from 1.8 to 2.2 may be used. Photodetectors having facing surfaces with various other refractive indices may be used in other exemplary embodiments.

According to the back illumination exemplary embodiments shown in FIGS. 1B and 1C, facing surface 11 of photodetector 7 may be a silicon nitride or similar film having a refractive index within the range of 1.8 to 2.2. In yet another exemplary embodiment of the back illumination arrangement such a film may not be used and the relevant refractive index of facing surface 11 is the refractive index of the material of which photodetector 7 is formed. In such back illumination embodiments as well as in the illustrated front illumination embodiment of FIGS. 3A and 3B, facing surface 11 is coated with optical thick film 13.

In an exemplary embodiment, optical thick film 13 may include a refractive index of 1.40. In an exemplary embodiment, optical thick film 13 may be silicone. In other exemplary embodiments, optical thick film 13 may be formed of other materials that have refractive indexes that preferably lie between the refractive indices of the respective materials which form the interface upon which the optical thick film is formed. For example, optical thick film 13 may include a refractive index within the range of 1.37–1.45. The application portion and shape of optical thick film 13 may vary in different exemplary embodiments. Optical thick film 13 may be a layer of material formed over the component surface. Optical thick film 13 may include a thickness 15 which lies within the range of 10–30 microns according to one exemplary embodiment, but other thicknesses may be used in other exemplary embodiments. For example, optical thick film 13 may extend continuously between optical fiber 15 and photodetector 7 in the optical coupling region, as will be shown in FIGS. 4B and 5.

Applicants have discovered that optical thick film 13 also reduces light loss by divergence of the light delivered by optical fiber 15 to photodetector 7. In prior art arrangements not using the optical coating 13 medium of the present invention, divergence of a light beam emanating from an optical fiber core is significant when extremely small beam diameters and light having long wavelengths is used. This, in turn, results in light loss and lower coupling efficiency, especially in 10 Gb/s photodetector coupling applications. Furthermore, application of the optical thick film improves the irradiance profile of light at the photodetector, i.e., light is distributed more evenly with the use of the optical thick film.

Figure 4A:
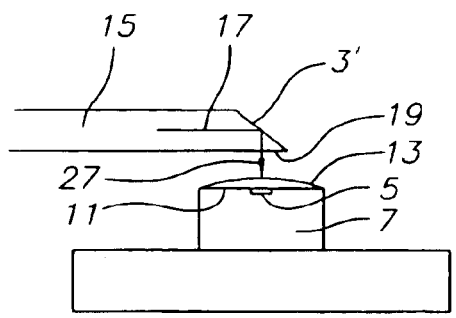
FIGS. 4A and 4B show another exemplary embodiment of the optical thick film formed between an optical fiber and a photodetector according to the present invention.
Figure 4B:
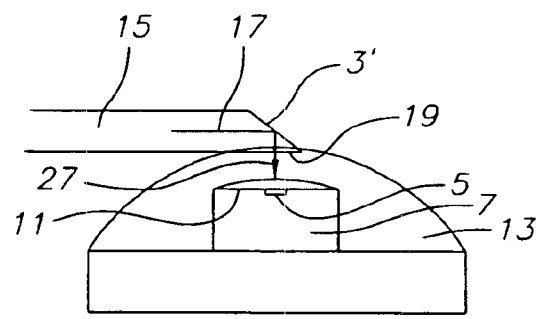

FIGS. 4A and 4B shows further exemplary embodiments of an optical coupling arrangement that employs optical thick film 13 according to the present invention. In FIGS. 4A and 4B, the longitudinal direction of optical fiber 15 is generally orthogonal to facing surface 11 of photodetector 7. End face 3' is angled and polished so that light propagating through optical fiber 15 along light propagation direction 17, internally reflects off polished end face 3' and exits optical fiber 15 at light delivery location 19 and along light beam delivery direction 27, which is generally orthogonal to the longitudinal direction of optical fiber 15. Light delivery location 19 is formed on a sidewall of optical fiber 15. Such sidewalls are generally smooth surfaces. In one exemplary embodiment, the sidewalls may include a surface roughness $R_a$ of less than 0.1 microns. In FIG. 4A, facing surface 11 is coated with optical thick film 13 as described above.

FIG. 4B is an exemplary embodiment of an optical coupling arrangement similar to the embodiment shown in FIG. 4A, but in which optical thick film 13 extends continuously from facing surface 11 of active area 5 of photodetector 7, to light delivery location 19 of optical fiber 15 in the optical coupling region. According to this exemplary embodiment, an air gap is not present between optical fiber 15 and photodetector 7 along the optical path. In this exemplary embodiment, the present invention provides that the refractive index of optical thick film 13 is higher than that of air so the difference between refractive indexes of the incident and transmitted media is reduced resulting in reduced reflectance at the optical fiber/optical thick film and photodetector/optical thick film interfaces, compared to optical fiber/air and photodetector/air interfaces, as according to Equation #1. The refractive index of optical thick film 13 may be at least one of between the refractive index of air and the refractive index of the optical fiber, and between the refractive index of air and the refractive index of facing surface 11 of photodetector 7. The arrangement shown in FIG. 4(B) is exemplary only and in other exemplary embodiments the optical thick film may extend continuously between an end face of an optical fiber and photodetector surface in the optical coupling region. Furthermore, the photodetector used in the sidewall emitting configuration shown in FIGS. 4A and 4B may be a back illumination photodetector.

Figure 5:
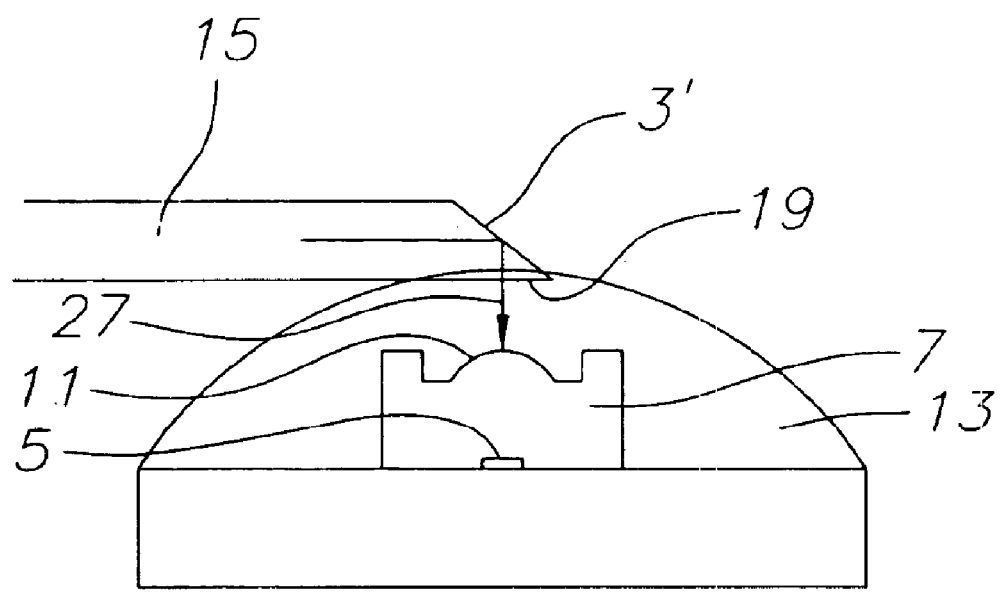
FIG. 5 shows still another exemplary embodiment of the optical matching coating formed between an optical fiber and a photodetector according to the present invention.

FIG. 5 shows an exemplary embodiment of an arrangement of optical fiber 15 coupled to photodetector 7 which is a back illumination photodetector and includes active area 5 disposed in the optical coupling region and along the optical path. Facing surface 11 is the surface of photodetector 7 opposite the surface upon which active area 5 is formed. In the exemplary embodiment illustrated in FIG. 5, facing surface 11 of back illumination photodetector 7 is shaped into a microlens, and optical thick film 13 extends continuously between facing surface 11 and light delivery location 19.

The optical thick film disposed on the surface of photodetector may additionally provide hermetical protection of the photodetector in various exemplary embodiments. The photodetector with the optical thick film, therefore, may be used in non-hermetic packages, as well as hermetic packages in which the gap formed between optical fiber 15 and photodetector 7 may be a vacuum or other media.

The preceding merely illustrates the principles of the invention. It will thus be appreciated that those skilled in the art will be able to devise various arrangements which, although not explicitly described or shown herein, embody the principles of the invention and are included within its scope and spirit. For example, the principles of the present invention may be applied to arrays of photodetectors.

Furthermore, all examples and conditional language recited herein are principally intended expressly to be only for pedagogical purposes and to aid in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and the functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims and their equivalents.

What is claimed is:

1. An apparatus comprising an optical fiber, a photodetector disposed adjacent said fiber, and an optical thick film disposed on said photodetector and having a refractive index between a first refractive index of air and a second refractive index of material for an exposed surface of said photodetector, wherein said optical fiber has a smooth light emitting surface region and said optical thick film extends between said smooth light emitting surface region and the exposed surface of said photodetector.

2. The apparatus as in claim 1, wherein said photodetector includes an active area and said optical fiber includes on the smooth light emitting surface region a light delivery location where light exits said optical fiber toward said active area.

3. The apparatus as in claim 1, wherein said material comprises silicon nitride.

4. The apparatus as in claim 1, wherein said exposed surface includes a surface of an active area of said photodetector.

5. The apparatus as in claim 1, wherein said photodetector comprises a substrate with an active area on a first surface of said substrate and along an optical path of light coupled from said optical fiber to said photodetector, and said exposed surface is an opposed surface of said substrate.

6. The apparatus as in claim 1, further comprising an optical source that causes light having a wavelength of one of 1310 nm and 1550 nm to propagate through said optical fiber.

7. The apparatus as in claim 1, wherein light exits said optical fiber at the smooth light emitting surface region formed at an end face of said optical fiber.

8. The apparatus as in claim 1, wherein light exits said optical fiber at a light delivery location formed on the smooth light emitting surface region of a sidewall of said optical fiber.

9. The apparatus as in claim 1, wherein said optical thick film is formed of silicone.

10. The apparatus as in claim 1, wherein said refractive index of the optical thick film lies within a range of about 1.34 to 1.45.

11. The apparatus as in claim 1, wherein said optical thick film includes a thickness within the range of 10–30 microns.

12. The apparatus as in claim 1, wherein said second refractive index lies within one of a range of about 3.0 to 3.5 and a range of about 1.8 to 2.2.

13. The apparatus as in claim 1, wherein said optical thick film reduces an amount of light reflected between air and said photodetector.

14. An apparatus comprising an optical fiber having a smooth end face, a photodetector disposed adjacent said fiber, and an optical thick film formed on said photodetector and extending between the photodetector and the smooth end face of the optical fiber, said optical thick film increasing an amount of light coupled from said optical fiber to said photodetector when light propagates in said optical fiber.

15. An apparatus comprising an optical fiber having a smooth light emitting surface region, a photodetector adjacent said optical fiber, and an optical thick film coating extending from said photodetector to said smooth light emitting surface region.

16. The apparatus as in claim 15, wherein said smooth light emitting surface region is on a sidewall of said optical fiber.

17. The apparatus as in claim 15, wherein said smooth surface has a surface roughness no greater than 0.1 microns $R_a$.

18. The apparatus as in claim 15, wherein said optical thick film coating has a refractive index of at least one of between a first refractive index of air and a second refractive index of said optical fiber and between said first refractive index and a third refractive index of material for an exposed surface of said photodetector.

19. The apparatus as in claim 15, wherein said optical thick film coating comprises silicone.

20. A method for increasing optical coupling efficiency between an optical fiber and a photodetector, comprising:

providing an optical fiber having a smooth light emitting surface region and a photodetector;

optically coupling the smooth light emitting surface region of said optical fiber to said photodetector; and disposing a coating on said photodetector such that the coating extends from the photodetector to the smooth light emitting surface region, said coating having a coating refractive index between a first refractive index of air and a second refractive index of material for a surface of said photodetector upon which said coating is disposed.

21. The method as in claim 20, wherein said disposing includes forming said coating of silicone.

22. The method as in claim 20, further comprising polishing an end face of said optical fiber to form the smooth light emitting surface region, and wherein said disposing further includes forming said coating to extend continuously between the smooth light emitting surface region on the end face of said optical fiber and said phoeodetector.

23. The method as in claim 20, wherein an end face of said optical fiber has been polished to cause light propagating through said optical fiber to exit through the smooth light emitting surface region formed on a sidewall of said optical fiber, and wherein said disposing further includes forming said coating to extend continuously between the smooth light emitting surface region on said sidewall and said photodetector.

* * * * *

UNITED STATES PATENT AND TRADEMARK OFFICE
CERTIFICATE OF CORRECTION

PATENT NO. : 6,892,010 B2  Page 1 of 1
APPLICATION NO. : 10/657836
DATED : May 10, 2005
INVENTOR(S) : Miao et al.

It is certified that error appears in the above-identified patent and that said Letters Patent is hereby corrected as shown below:

On the Title Page , Col. 2

(56) References Cited           Insert
U.S. Patent Documents           --6,642,068  B1  *  11/2003  Hayes et al.
                                  2004/0017977 A1  * 01/2004  Lam et al.--

Column 10, line 21, Claim 22    Delete "phoeodetector",
                                Insert --photodetector--

Signed and Sealed this

Fifteenth Day of August, 2006

JON W. DUDAS
*Director of the United States Patent and Trademark Office*